United States Patent [19]
Brown et al.

[11] Patent Number: 6,047,630
[45] Date of Patent: *Apr. 11, 2000

[54] BEVERAGE BREWING DEVICE HAVING AN INTEGRAL BEVERAGE SERVER LOCKING APPARATUS

[75] Inventors: Jeffrey C. Brown, Seattle, Wash.; Gustavo Caicedo, Mission Viejo, Calif.; Christopher Ferguson, Everett, Wash.; Mauricio J. Mirand, Long Beach, Calif.; John Tilden, Bellevue, Wash.

[73] Assignee: BE Aerospace, Inc., Delray Beach, Fla.

[ * ] Notice: This patent is subject to a terminal disclaimer.

[21] Appl. No.: 09/025,285

[22] Filed: Feb. 16, 1998

[51] Int. Cl.⁷ ...................................................... A47J 31/00
[52] U.S. Cl. ................................ 99/279; 99/275; 99/290; 99/304; 99/323.3
[58] Field of Search ............................. 99/275, 279, 290, 99/295, 300, 304, 305, 306, 307, 289 R, 323.3, 302 R; 248/636

[56] References Cited

U.S. PATENT DOCUMENTS

| | | | |
|---|---|---|---|
| 2,637,266 | 5/1953 | Grado | 99/307 X |
| 3,181,732 | 5/1965 | Immermann et al. | 99/289 R X |
| 4,949,627 | 8/1990 | Nordskog | 99/281 |
| 5,183,998 | 2/1993 | Hoffman et al. . | |
| 5,704,275 | 1/1998 | Warne . | |
| 5,752,618 | 5/1998 | Trebitz et al. . | |
| 5,913,961 | 6/1999 | Chmiel et al. | 99/307 X |

*Primary Examiner*—Reginald L. Alexander
*Attorney, Agent, or Firm*—Quarles & Brady LLP

[57] ABSTRACT

A beverage brewing device has an integral server locking mechanism. The beverage server (10) has top and bottom portions, (16) and (18), having first and second lips, (12) and (14), respectively. An opening in a lower server support plate (20) has a first retaining face (22) which contacts the first lip. The server support plate is preferably pivotably mounted about a pivot point (26) and biased to apply an upward force to the first end of the server. An upper server support plate (30) is positioned at the other end of the beverage server. The second support plate pivots about a second pivot point (36) and is biased downwardly, toward the first base plate. Thus, the support plates cooperate in a clamshell-like manner to secure the beverage brewing device therebetween.

19 Claims, 11 Drawing Sheets

BEVERAGE BREWING DEVICE HAVING AN INTEGRAL BEVERAGE SERVER LOCKING APPARATUS

CROSS REFERENCE TO RELATED APPLICATIONS (Not Applicable)

STATEMENT REGARDING FEDERALLY SPONSORED RESEARCH OR DEVELOPMENT (Not Applicable)

TECHNICAL FIELD

This invention relates generally to a beverage brewing device, and more particularly to a beverage brewing device for use in an aerospace environment.

BACKGROUND OF THE INVENTION

Manufacturers of beverage brewing devices, such as coffee makers, offer a variety of device models having a number of different structural designs and features. Although particular design features vary from model to model, most beverage brewing devices have a number of common structural elements. For example, coffee makers generally include a housing, a coffee server, and a brew cup for holding coffee grinds. Furthermore, the housing typically has an internal water containment region and a space for receiving the coffee server within the housing. For most typical applications, such an arrangement is sufficient and there is no need for the provision of additional features for securing the coffee server to the housing. However, there are circumstances in which such additional securing measures are necessary. Generally, auxiliary support may be required where the beverage brewer is used under conditions which are likely to subject the device to vibrational and/or accelerative motion capable of jarring the server loose from the device housing.

For example, coffee makers on an aircraft require such additional securing measures. In particular, the various components of the brewing device which are separable from the housing, namely, the server and brew cup, must be adequately secured to prevent their intrusion into the aircraft cabin during takeoff, landing and under turbulent conditions. Known approaches for preventing such occurrences incorporate the storage of the brewing apparatus within a compartment having a lever arm which must be manually moved between a locked and a release position. The lever arm is typically opened and closed each time the beverage server is placed in, or removed from, the storage compartment, particularly when the aircraft is in flight. This approach is inefficient and may present a danger when, for example, the lever arm is in its unlocked position. In such an instance, there is a risk that the beverage server will be ejected from the storage compartment into the cabin. Furthermore, the lever arm of such conventional systems may itself present a danger, as it extends into the cabin area when unlocked and flight crew and passengers are forced to maneuver around it in a compact galley area. Under turbulent conditions, the lever arm presents a potential hazard.

Beverage brewing devices designed for use on aircraft have additional inherent problems. One such problem relates to internal electronic components which form part of the circuitry used to operate the brewing device. In particular, metal oxide semiconductor field effect transistors (MOSFETs), which are typically used to control the flow of current to and from water heating elements of the brewing apparatus, can suffer a reduced life if their temperature is not adequately controlled by use of a heat sinking apparatus. Another inherent problem relates to maintenance of the brewing apparatus. Coffee brewing devices manufactured for use on aircraft are prone to malfunctioning from time to time. Presently, diagnostic testing requires the removal of the coffee maker from the aircraft so that it can be transported to a diagnostic testing facility. Often, when such diagnostic testing is performed, the failure will not occur with the result that the problem with the unit cannot be diagnosed.

For the foregoing reasons, it would be desirable to have a beverage brewing apparatus in which the beverage server and brew cup remain adequately secured to the housing, preventing their disengagement from the housing under vibrational and accelerative forces. The securing mechanism should be incorporated into the brewing apparatus itself, precluding the need for external securing means. It would also be advantageous if the apparatus had an interface for performing on-board diagnostic self-testing, to record unit performance and assist in repair processes. Similarly, it would be desirable for the beverage apparatus to have an integral data link system which could be used to transfer diagnostic data from the device to an analytical device, such as a computer.

SUMMARY OF THE INVENTION

Briefly, according to the invention, there is provided a beverage brewing device having a beverage server locking mechanism for securing a beverage server in a server receiving portion of the device. The brewing device further comprises a brew cup locking mechanism for securing a beverage brew cup in a brew cup receiving portion of the device. The locking mechanisms prevent disengagement of the beverage server and brew cup from the device housing when the device is subjected to vibrational and accelerative forces.

The server locking mechanism comprises a first engagement element having a first retaining face for engaging a lip at a first end of the beverage server. The first engagement element is biased for applying a force perpendicular to the first end, urging the server toward a second engagement element situated adjacent to an opposing second end of the beverage server. The second engagement element has a second retaining face for engaging a second lip at the second end of the server. The second engagement element is biased for applying a force perpendicular to the second end of the beverage server, urging the server toward the first engagement element. The biasing action of the first and second engagement elements is imparted via a linkage system interconnecting the first and second engagement elements, causing the first and second biased engagement elements to cooperate in a clamshell-like manner to secure the beverage server therebetween.

The brew cup locking mechanism, which mechanically cooperates with the beverage server locking mechanism, comprises a brew cup lid having a lid engagement portion, a pivotable latch, and a spring-loaded pin. The lid engagement portion has first and second recesses. The first recess is for engaging a latching portion of the pivotable latch, and the second recess is for engaging the spring-loaded pin. When the brew cup is in a locked position, the latching portion engages the first recess, and the pin is disengaged from the second recess. When the brew cup is in an unlocked position, the latching portion is disengaged from the first recess, and the pin engages the second recess.

An integral water supply apparatus is provided for supplying heated water to the beverage brewing device. The water supply apparatus comprises a water tank having first and second ends. An end cap covers the first end, and a water inlet is provided adjacent to the first end for receiving cool water. Heating elements, provided for heating the water, extend from the second end into an interior portion of the tank. Electronic components are provided for controlling the flow of electric current to the heating elements. The electronic components are fixedly attached to the end cap. The cool water entering the first end of the tank serves to cool the end cap. As a result, the end cap acts as a heat sink for the electronic components, creating a thermal gradient for drawing heat away from the electronic components.

The beverage brewing system preferably includes a self-test diagnostic system having one or more sensors for monitoring various aspects of the brewing system's performance. For example, the sensors may be used to monitor water temperature, water flow rate, heating rates, and any other aspect of the brewing system operation. The data collected from sensors is provided to a microprocessor and can be used for controlling the brew cycle, comparison with pre-determined performance criteria which may be stored in memory, and for recording of faults when data results fail to conform to the performance criteria. The data, particularly concerning system faults, is preferably stored in a non-volatile memory.

The self test diagnostic system includes a data transmitter for downloading of performance and fault data. The data transmitter may be configured as an infrared link, an RF link or any other suitable communications link for communicating data stored in the memory to a data recorder. The data recorder has a corresponding data transceiver for enabling it to transmit and receive data from the brewing system. The system can be configured so that the data recorder initiates the data download from the brewing system by transmitting a report initiation code.

The brewing system preferably includes a second data link which can also be effected as an optical link, RF link or hard wire link. The second data link preferably includes a data transceiver unit which communicates bi-directionally with an onboard aircraft computer. The brewing system is responsive to commands from the aircraft computer for remote operation and/or downloading diagnostic data via a data transceiver unit. Thus any detected faults or performance deficiencies can be communicated to the aircraft computer as requested.

In another embodiment of the invention, the brew cup locking mechanism comprises fourth and fifth linkages interconnecting the brew cup lid and the second engagement element. The fourth linkage is connected at a first end to the second engagement element, and at a second end to the fifth linkage. A first end of the fifth linkage is torsionally-loaded about a third pivot point. The second end of the fifth linkage is pivotably-attached to an upper surface of the brew cup lid. The torsional-loading biases the brew cup lid downward against the brew cup. To unlock the brew cup, the fourth linkage applies a moment to the fifth linkage, which counteracts the bias created by the torsional loading. As a result, the brew cup lid is forced upward and away from the brew cup. A spring-loaded leg attached to the fifth linkage extends vertically to support the brew cup lid in an open position.

In yet a further embodiment of the invention, the brew cup locking mechanism comprises a fourth linkage and a second pivotable latch which cooperate independently with features of the brew cup and brew cup lid. In this embodiment, the sides of the brew cup each have an integral S-shaped latching feature and a triangular portion. When the brew cup is in a locked position, the second pivotable latch is torsionally-biased to engage a lower segment of the S-shaped latching feature, preventing the brew cup from being slidably removed from the brew cup receiving portion. A first end of the fourth linkage is torsionally-biased about a third pivot point. A second end of the fourth linkage is pivotably-attached to an upper surface of the brew cup lid. With the brew cup in a locked position, the fourth linkage forces the lid downward against the brew cup. To unlock the brew cup, a force is applied by the second engagement element to the second pivotable latch, disengaging the pivotable latch from the S-shaped latching feature. With the second pivotable latch disengaged, the brew cup is slidably-removed from brew cup receiving portion. Upon sliding, an upper portion of the S-shaped latching feature engages the triangular portion of the brew cup lid, forcing the brew cup lid away from the brew cup.

In still a further embodiment of the invention, the brew cup locking mechanism comprises a fourth linkage and a second pivotable latch which cooperate dependently with one other. A first end of the fourth linkage is connected to the second engagement element. A second end of the fourth linkage is connected to a first end of the second pivotable latch. First and second lid support linkages are provided. First ends of the first and second lid support linkages are pivotably-attached to the beverage device housing. Second ends of the first and second lid support linkages are pivotably-attached to first and second lid connection points, respectively. An extension spring having first and second ends is provided. The first end of the extension spring is attached to the device housing, while the second end of the spring is attached to the first lid connection point. The extension spring applies a force to the brew cup lid, biasing the lid away from the brew cup. To unlock the brew cup, a force is applied to the fourth linkage, causing the second pivotable latch to pivot about the third pivot point. As a result, the second pivotable latch is disengaged from the first brew cup lid connection point. With the latch disengaged, the brew cup is slidably-removed from the brew cup receiving portion. As the brew cup is removed, the extension spring acts to release the brew cup lid from the top of the brew cup.

DETAILED DESCRIPTION OF THE PREFERRED EMBODIMENTS

Figure 1:
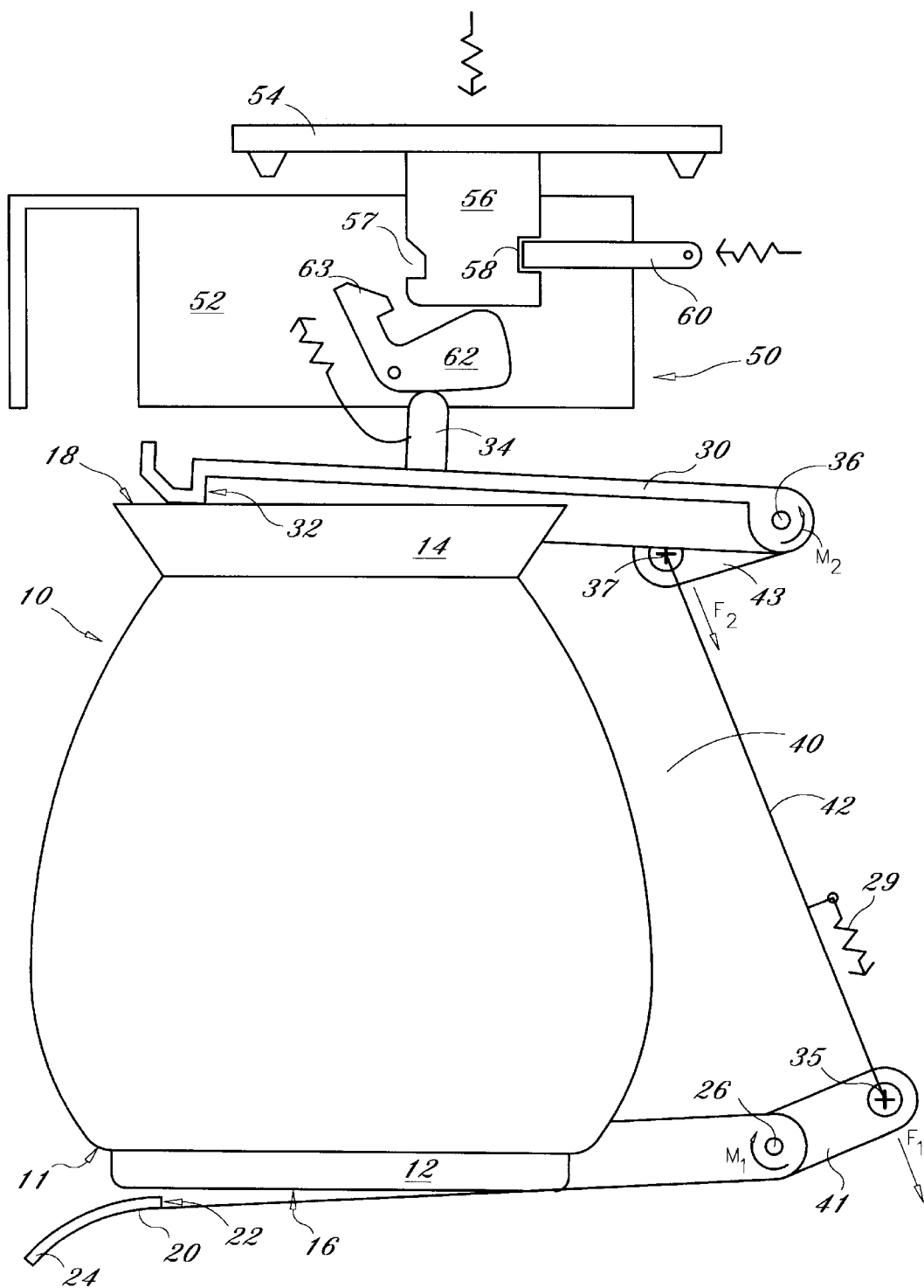
FIG. 1 is a schematic illustration showing the server and brew cup locking mechanisms in an unlocked position, in accordance with the preferred embodiment of the invention.

While the specification concludes with claims defining the features of the invention that are regarded as novel, it is believed that the invention will be better understood from a consideration of the following description in conjunction with the drawing figures, in which like reference numerals are carried forward.

Figure 2:
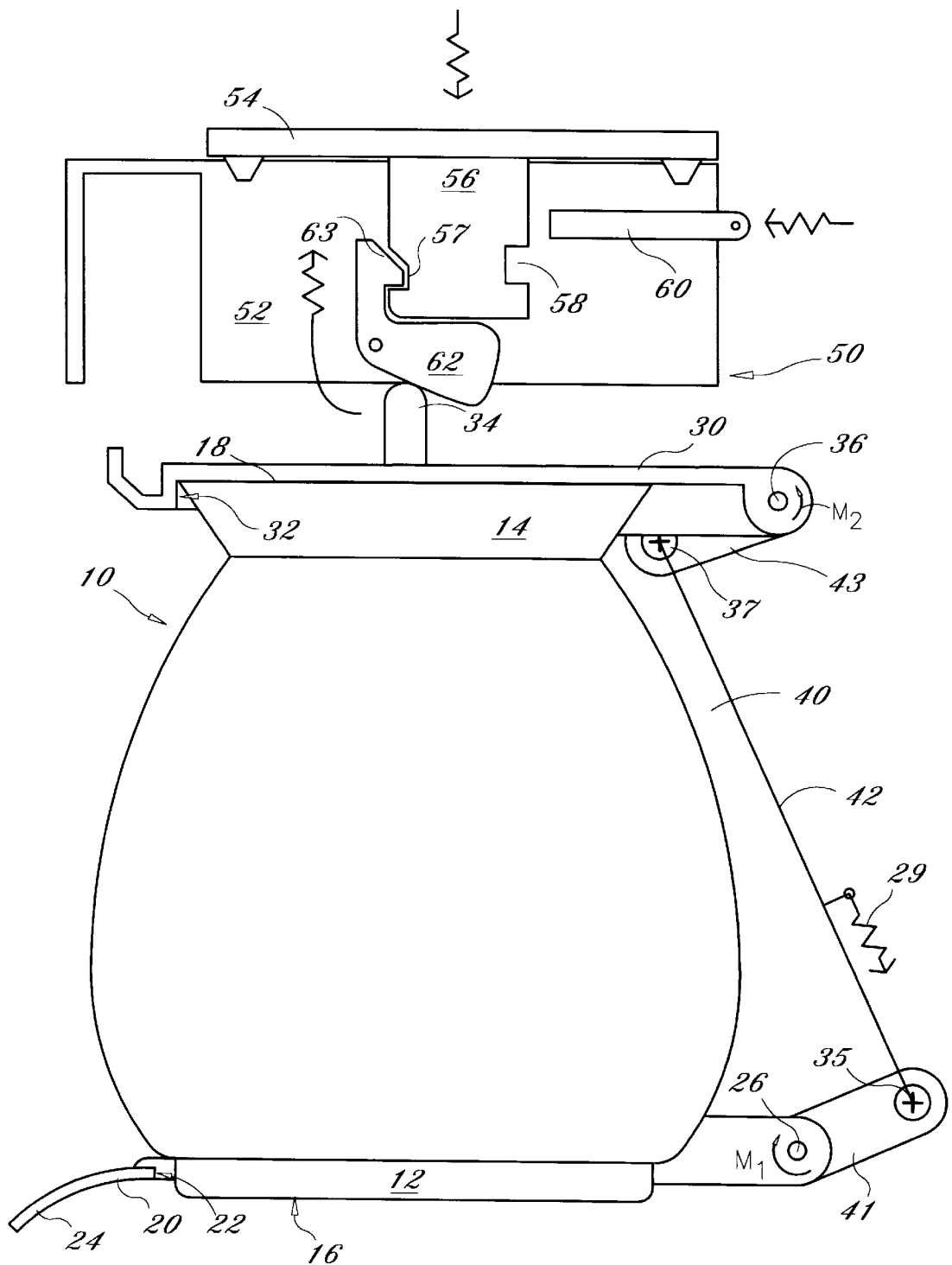
FIG. 2 is a schematic illustration showing the server and brew cup locking of mechanisms of FIG. 1 in a locked position, in accordance with the preferred embodiment of the invention.

Referring now to FIGS. 1 and 2, a beverage brewing device has a server locking mechanism for securing a beverage server 10, such as a coffee pot, in a server receiving portion 40 of the device. The beverage server has first and second ends, 16 and 18, respectively. The first and second ends have first and second lips, 12 and 14, respectively. A first engagement element 20 has a first retaining face 22 which contacts the periphery of the first lip 12, when the beverage server is properly secured. In a preferred embodiment, the first engagement element is a metal plate having an opening for receiving the first lip. The retaining face 22 prevents the beverage server from sliding along the metal plate surface. It will occur to those skilled in the art that alternative plate structures could provide the same function. For example, we envision using a recess, in lieu of an opening, for retaining the first end of the server. The first engagement element 20 is preferably pivotably mounted within a housing at a pivot point 26 and is biased upwardly such that it applies a force to the first end 16 of the beverage server 10. This force urges the server toward a second engagement element 30.

The second engagement element 30 is positioned adjacent to the second end 18 of the beverage server 10. When the beverage server is inserted into the server receiving portion 40, a second retaining face 32 securely engages a peripheral portion of the second lip 14. The second engagement element is preferably pivotally mounted to the housing at a second pivot point 36 and biased downwardly, toward the first engagement element, applying a force to the second end 18 of the beverage server 10. This force urges the server toward the first engagement element 20.

It may occur to one skilled in the art that a variety of methods could be employed to provide the aforementioned biasing action. However, we prefer to use a linkage system for joining the first and second engagement elements 20, 30. Preferably a pair of identical linkage systems are provided on opposite sides of the beverage brewing device. However, a clear understanding of the function of the linkage system can be gained by a discussion directed to the operation of a single linkage system, as shown in the drawing figures.

In our preferred embodiment, a first linkage 41 is secured to the first engagement element 20 at first pivot point 26. A second linkage 43 is secured to the second engagement element 30 at second pivot point 36. A third linkage 42 interconnects the first and second linkages at first and second linkage connection points 35 and 37, respectively. The third linkage is biased for imparting forces, $F_1$ and $F_2$, on the first and second links, 41 and 43, respectively. In a preferred embodiment, a spring 29 can be used for this purpose. The forces $F_1$ and $F_2$ create respective first and second moments, $M_1$ and $M_2$, about first and second pivot points 26 and 36. The first and second moments urge the first and second engagement elements toward each other such that the engagement elements cooperate in a clamshell-like manner to secure the beverage server therebetween.

The foregoing drawings and description provide one possible arrangement for securely engaging a first and second server lip. It should be recognized, however, that the invention is not limited in this regard. In particular, any other suitable mechanism may be used to bias each of the first and second engagement elements toward one another for securely engaging the first and second server lips 12, 14. For example, instead of a pivoting action for the first and second engagement elements, they may be designed to operate in along vertical tracks biased toward one another for engaging the beverage server lips.

Still referring to FIGS. 1 and 2, a brew cup locking mechanism is provided for securing a brew cup 52 within a brew cup receiving portion 50 of the beverage brewing device. The brew cup locking mechanism includes a brew cup lid 54, a pivotable latch 62 and a pin 60, which cooperate with each other, and with the server locking mechanism, to secure the brew cup in place. The brew cup lid 54 has a lid engagement portion 56 extending downwardly therefrom. The lid engagement portion has first and second recesses, 57 and 58, respectively, formed on opposing sides of the engagement portion.

The server and brew cup are simultaneously unlocked by depressing release portion 24 of first engagement element 20. Depressing first engagement element biases first linkage 41 toward second linkage 43, via third linkage 42. The resulting upward force on the second linkage causes second engagement element 30 to rotate counter-clockwise about second pivot point 36. Pivot latch contact portion 34, protruding from the second engagement element, contacts a bottom surface of pivotable latch 62 to disengage latching portion 63 from first recess 57. Simultaneously, brew cup lid 54 is forced upwards until pin 60 engages second recess 58. Thus, with one simple pressing action, the server and brew cup locking mechanisms are disengaged, allowing beverage server 10 and brew cup 52 to be removed from respective receiving portions 40 and 50.

Figure 3:
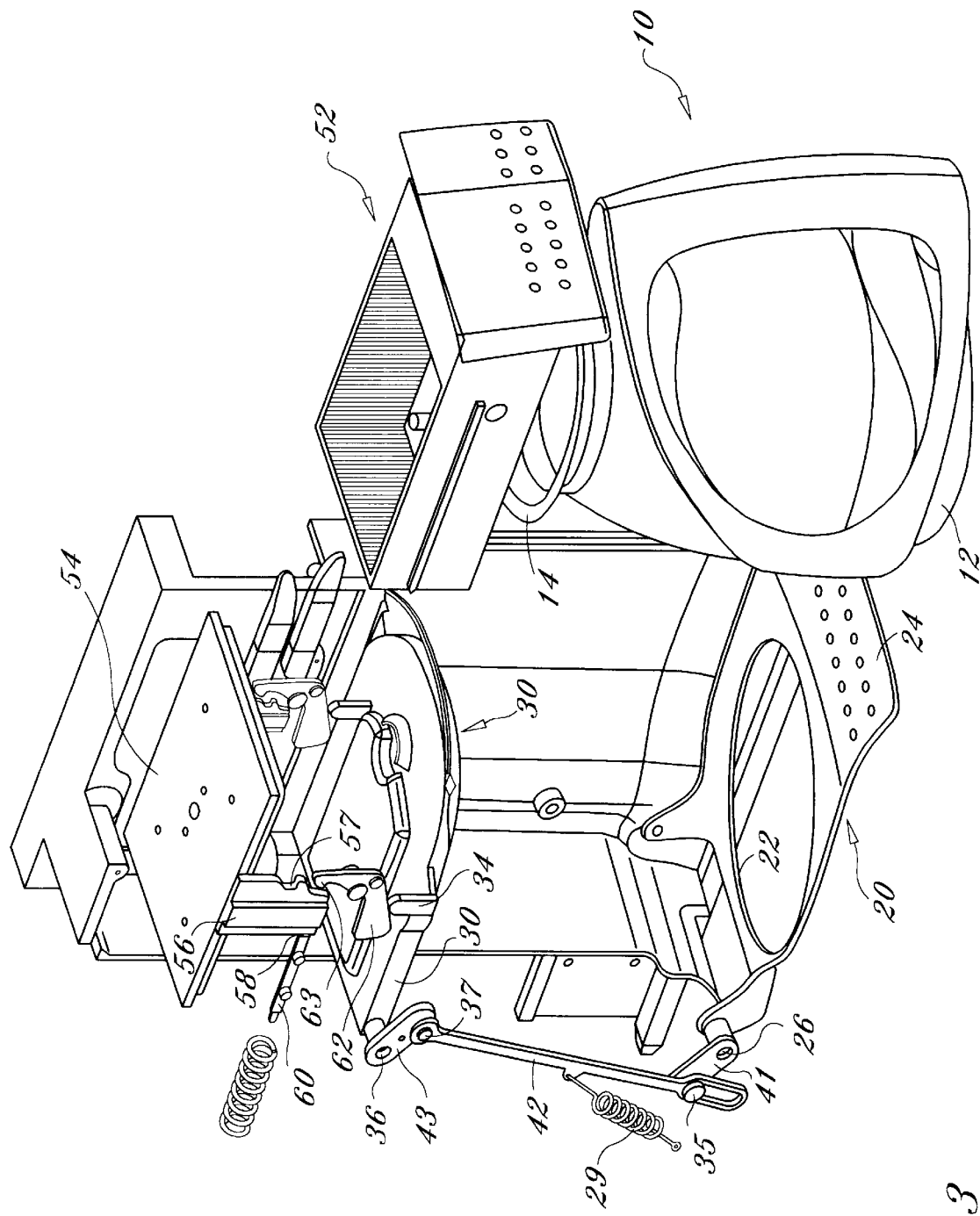
FIG. 3 is a cutaway perspective view of a beverage brewing device incorporating the invention shown in FIGS. 1 and 2, with the brew cup removed.
Figure 4:
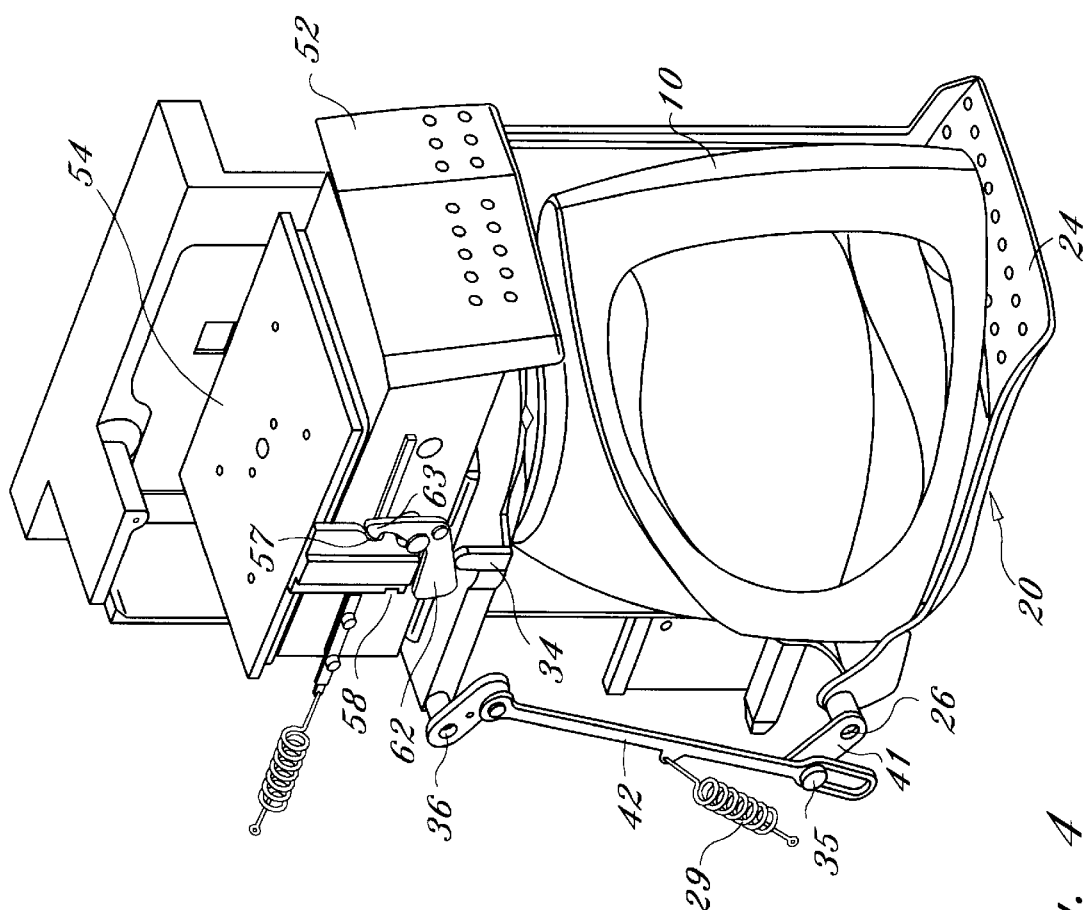
FIG. 4 is a cutaway perspective view of the beverage brewing device of FIG. 3 with the brew cup in a locked position.

FIGS. 3 and 4 are partial cutaway views of a beverage brewing device and server which incorporate the invention as described above in FIGS. 1 and 2. In FIGS. 1 and 2 and FIGS. 3 and 4, common elements are identified with the same reference numerals for simplicity. FIGS. 3 and 4 illustrate a preferred embodiment of the invention incorporated into a housing. In FIG. 3, the beverage server 10 and brew cup 52 are shown removed from the unit. In FIG. 4, the beverage server 10 and the brew cup 52 are shown locked in position.

Figure 5:
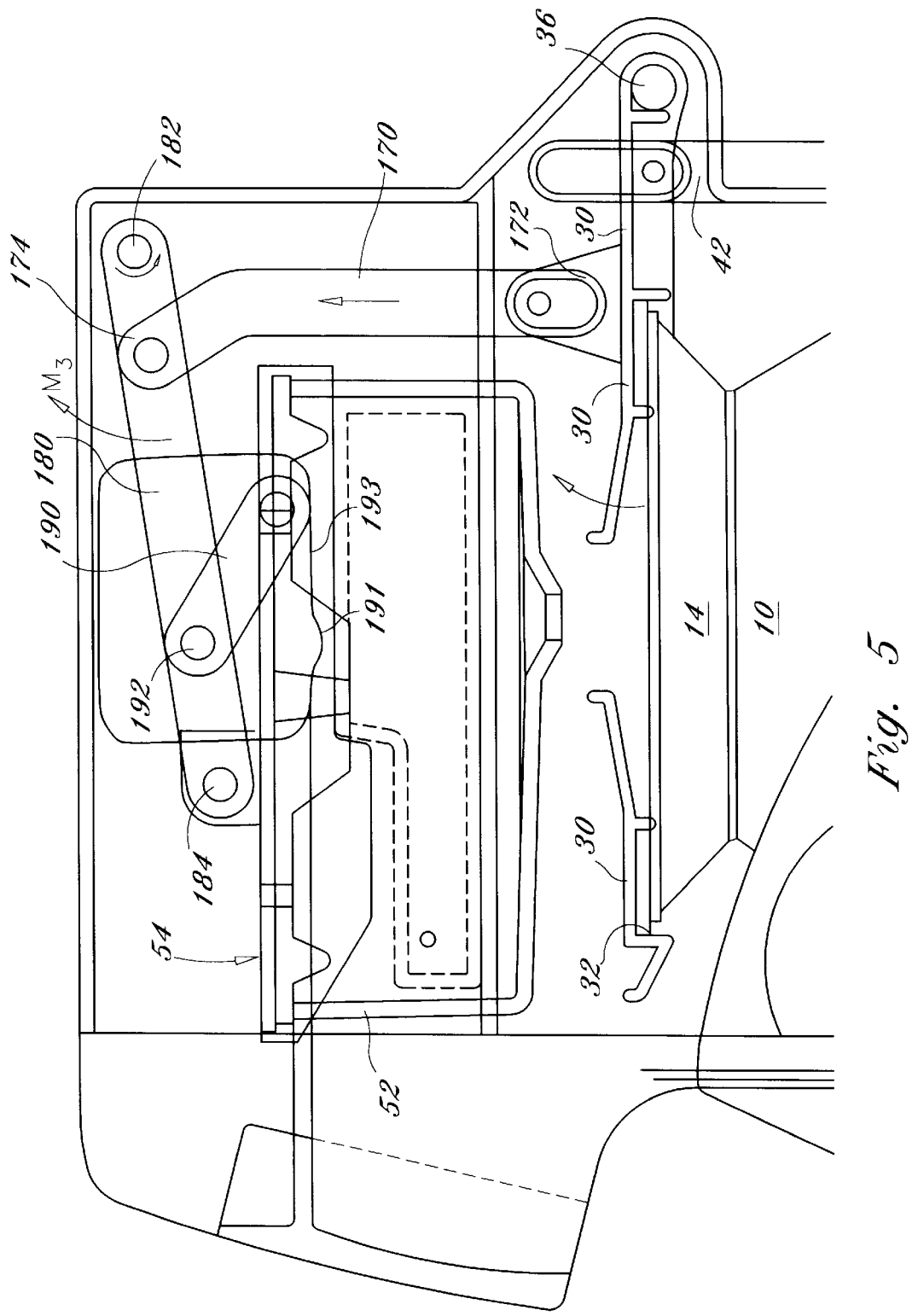
FIG. 5 is a side view illustrating a first alternate embodiment of a brew cup locking mechanism, in accordance with the present invention.

Referring now to FIG. 5, in a first alternate embodiment, the brew cup locking mechanism comprises a series of linkages which cooperate to releasably secure the brew cup 52 within the brew cup receiving portion. The brew cup locking mechanism comprises fourth and fifth linkages, 170 and 180, respectively, interconnecting the brew cup lid 54 and the second engagement element 30. Fourth linkage 170 is connected to the second engagement element at first end 172, and to fifth linkage 180 at second end 174. Fifth linkage 180 has a first end torsionally-loaded about a third pivot point 182. An opposing second end of fifth linkage 180 is pivotably-attached at interconnect point 184 to an upper surface of brew cup lid 54. The torsional-loading biases the brew cup lid downwardly against the brew cup 52. To unlock the brew cup, fourth linkage 170 applies a moment, $M_3$, to fifth linkage 180, counteracting the bias created by the torsional loading about third pivot point 182. As a result, the brew cup lid 54 is forced upward and away from the brew cup 52. A spring-loaded leg 190, attached to the fifth linkage at interconnect point 192, extends vertically to support the brew cup lid in an open position. The leg 190 slides along ledge 193 until it engages recess 191. Upon reinsertion, the brew cup contacts the leg, releasing it from recess 191 and returning it to an unlocked position.

Figure 6:
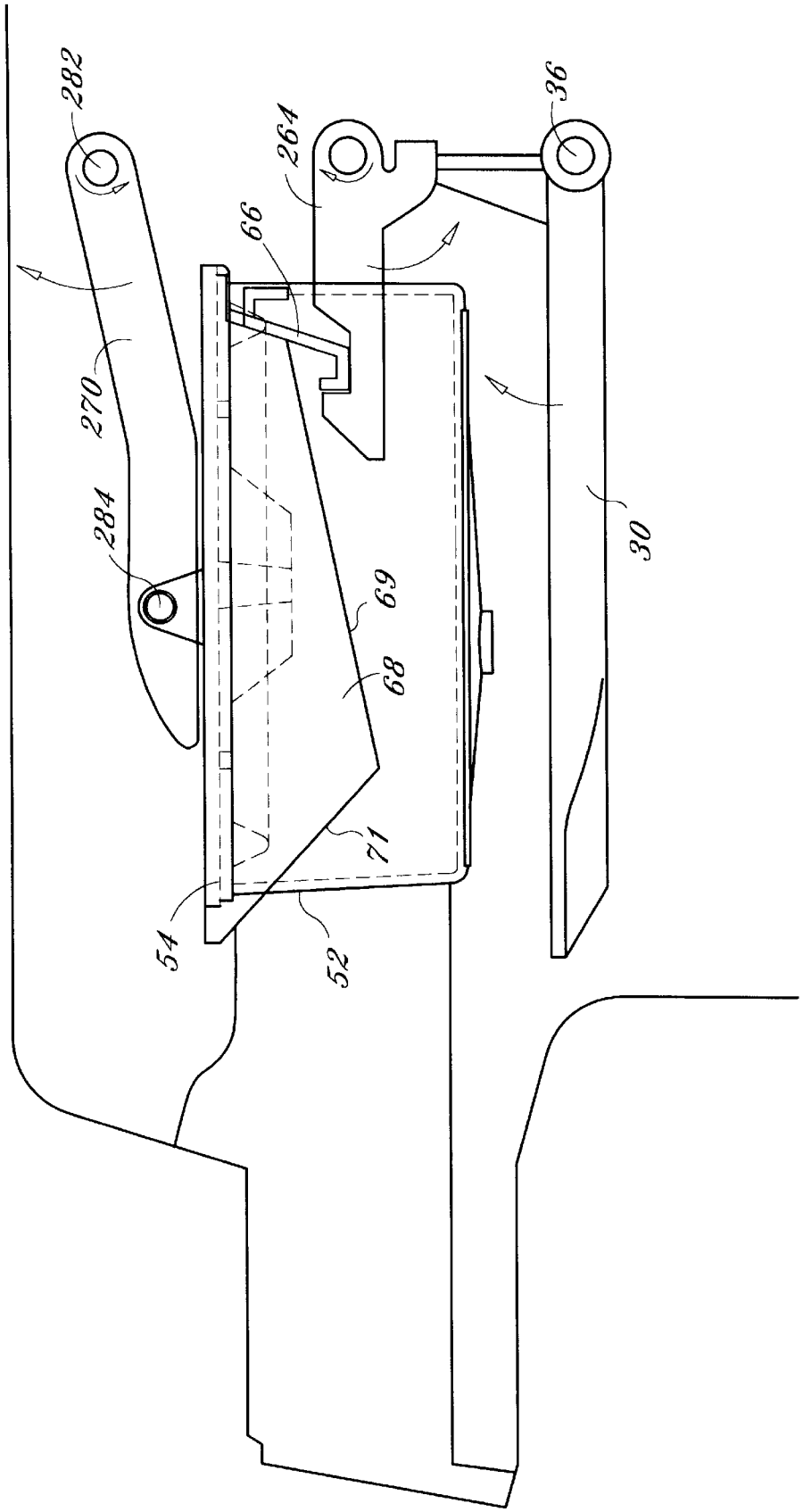
FIG. 6 is a side view illustrating a second alternate embodiment of a brew cup locking mechanism, in accordance with the present invention.

Referring now to FIG. 6, a second alternate embodiment of the brew cup locking mechanism comprises a fourth linkage 270 and a second pivotable latch 264 which cooperate independently with features of the brew cup 52 and brew cup lid 54. In particular, brew cup 52 has an integral S-shaped latching feature 66 and a raised triangular feature 68 formed thereon. When the brew cup is in a locked position, the second pivotable latch 264 is torsionally-biased to engage a lower segment of S-shaped latching feature 66, preventing the brew cup from being slidably removed from the brew cup receiving portion. A first end of the fourth linkage is torsionally-biased about a third pivot point 282. A second end of the fourth linkage is pivotably-attached to an upper surface of the brew cup lid at connection point 284. With the brew cup in a locked position, fourth linkage 270 forces the brew cup lid 54 downward so that it is received by the brew cup 52. To unlock the brew cup, a force is applied by second engagement element 30 to second pivotable latch 264, disengaging the latch from the bottom portion of the S-shaped latching feature 66. With the second pivotable latch disengaged, the brew cup is slidably-removed from brew cup receiving portion. Upon slidably removing the brew cup, an upper portion of the S-shaped latching feature 66 engages a lower surface 69 of the triangular portion 68 of the brew cup lid, forcing the brew cup lid away from the brew cup. Upon reinsertion, the upper portion of the S-shaped latching feature contacts surface 71, urging the brew cup lid upwards until the second pivotable latch 264 reengages the bottom portion of the S-shaped latching feature.

Figure 7:
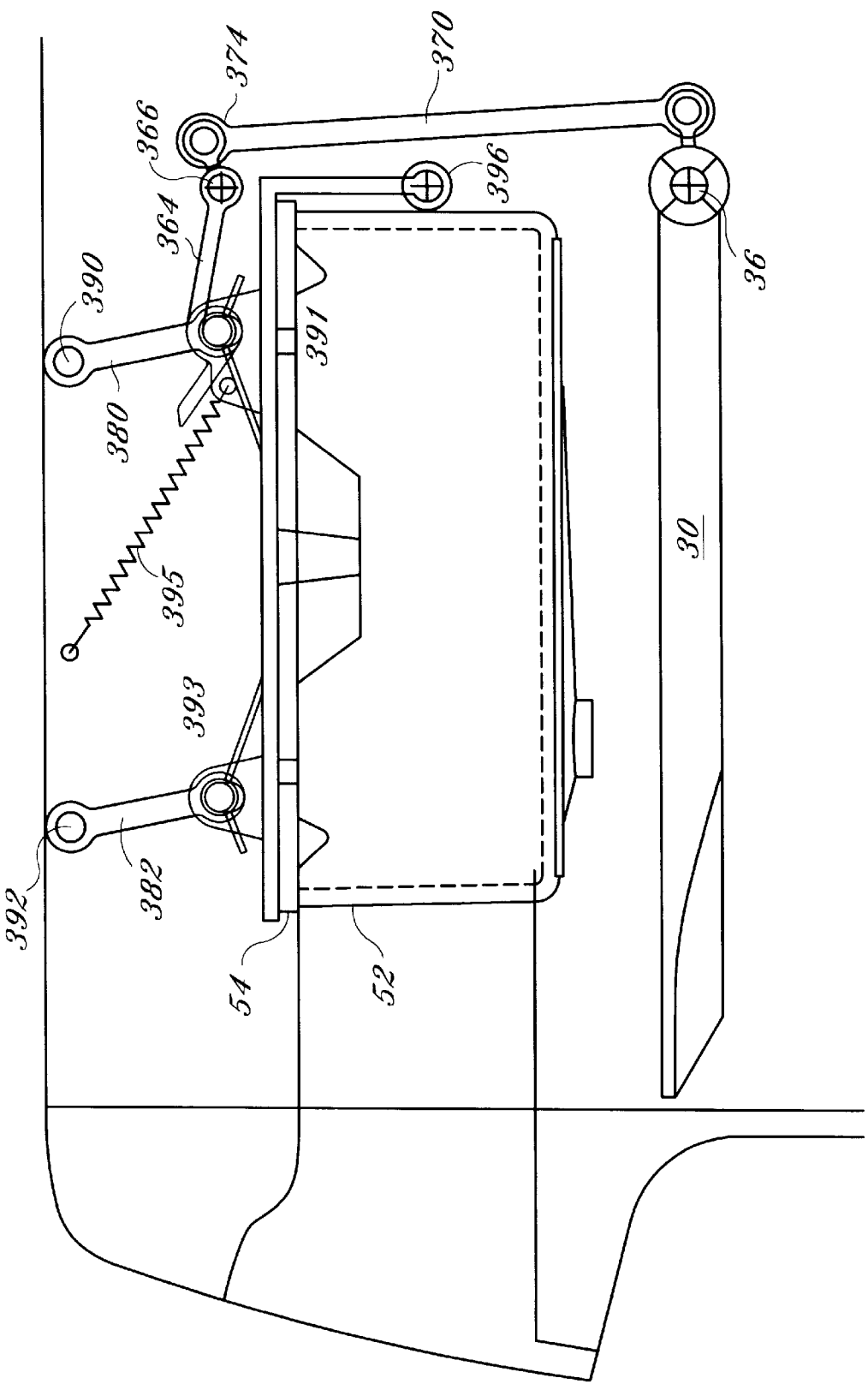
FIG. 7 is a side view illustrating a third alternate embodiment of a brew cup locking mechanism, in accordance with the present invention.

Referring now to FIG. 7, a third alternate embodiment of the brew cup locking mechanism is shown. The locking mechanism has a second pivotable latch 364 which cooperates with second engagement element 30 via fourth linkage 370. First and second support linkages, 380 and 382, respectively, are pivotably attached at respective first ends, 390 and 392, to the device housing, and at respective second ends, 391 and 393, to an upper surface of the brew lid 54. Extension spring 395 is connected at opposing ends to the brew cup lid 54 and the beverage brew device housing. Thus, extension spring 395 biases brew cup lid 54 upwardly and away from the top of brew cup 52. As second engagement element 30 is urged upwardly, a resulting downward force transferred to fourth engagement element 370 biases second pivotable latch 374 to pivot (counter-clockwise) about latch pivot point 366. As a result, second pivotable latch 364 is unlatched from second end 391 of first support linkage 380. As brew cup 52 is subsequently slidably removed from the brew cup receiving portion, extension spring 395, urges support linkages 380 and 382 to rotate about lid support connection points 390 and 392, respectively. This rotational motion urges brew cup lid 54 away from brew cup 52. As the brew cup is reinserted into the brew cup receiving portion, it contacts brew cup lid engagement portion 396, urging brew lid 54 downward onto the brew cup.

Figure 10:
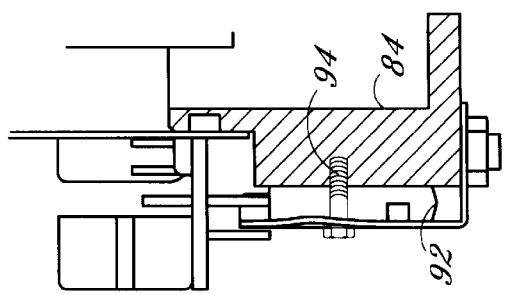
FIG. 10 is an enlarged view of a portion of FIG. 9
Figure 9:
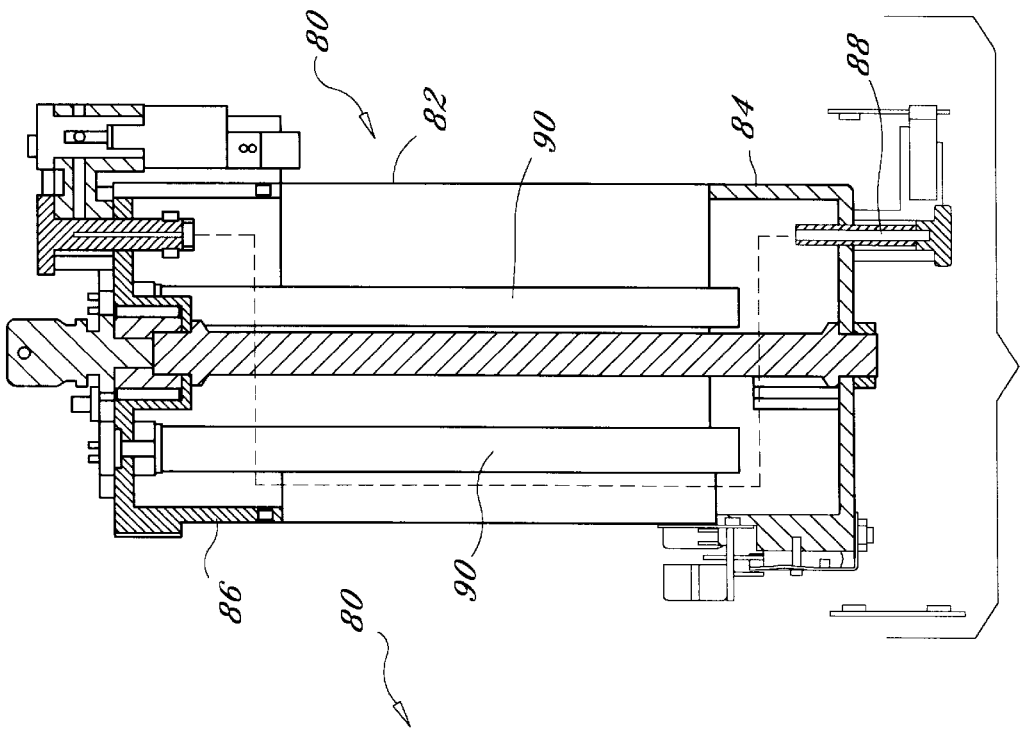
FIG. 9 is a cross-sectional view taken along lines 9—9 in FIG. 8.
Figure 8:
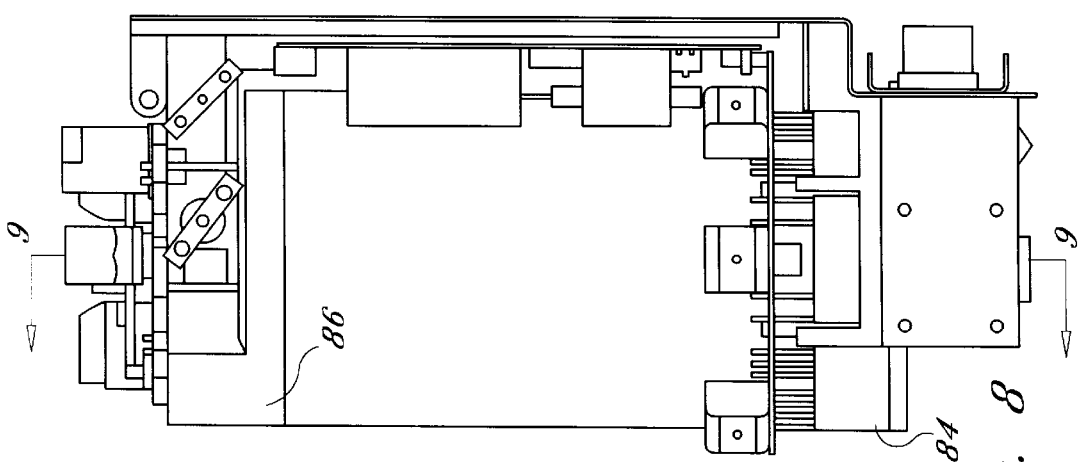
FIG. 8 is a side view of a beverage brew device water supply apparatus, in accordance with the present invention.

FIGS. 8–10 illustrate various features of an integral water supply apparatus 80 for use with the beverage brewing system according to the invention. The water supply apparatus includes a water tank 82 having first and second ends 84 and 86 respectively, and a water inlet 88. One or more electric heating elements 90 are provided and extend into the interior of the tank.

FIG. 10 is an enlarged view of a circled portion of FIG. 9 showing electronic components 92 which may be MOSFET's. The electronic components are preferably used to control the flow of electric power to the heating elements 90. However, the invention is not limited in this regard. As shown in FIG. 10, the electronic components 92 are mounted to the first end cap 84 of the water tank, the end cap preferably being formed of a heat conducting material such as aluminum. As shown in FIG. 9, the electronic components are advantageously mounted near to where cool water enters the tank 82 via water inlet 88. The water thus provided aids in cooling the electronic components 92. Concurrently the electronic components aid in heating the cool water as it flows upwardly in the tank 82. The integral water supply thus performs a dual function, heating water for the beverage brewing device and cooling the electronic components 92 which control the heating elements 90. A suitable screw fastener 94 or other retaining means may be used to hold the electronic component 92 in place and to further aid in heat transfer.

Figure 11:
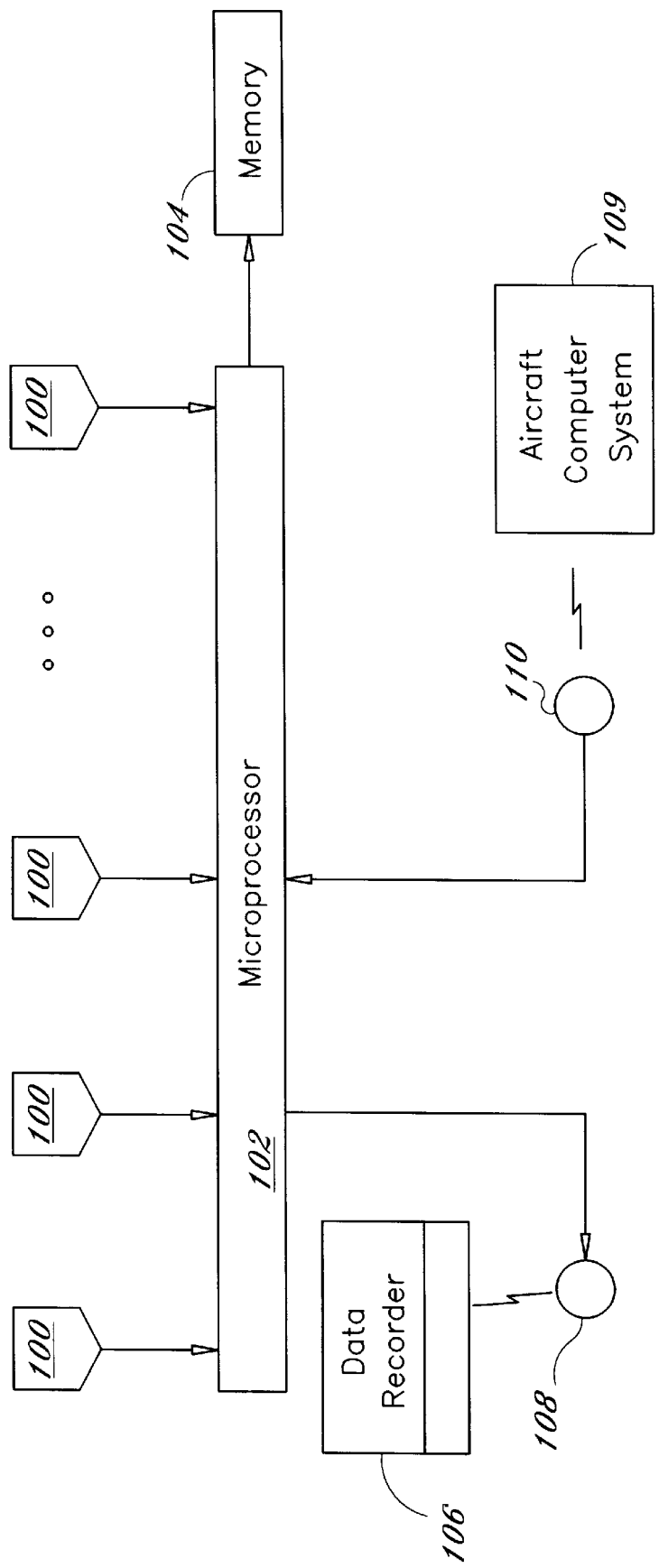
FIG. 11 is a block diagram illustrating the self diagnostic and optical link system of the invention.

FIG. 11 is a block diagram showing the self-test diagnostic system incorporated into the brewing device. As shown therein, the beverage brewing system preferably includes one or more sensors 100 which are provided for monitoring various aspects of the brewing system's performance. For example, the sensors may be used to monitor water temperature, water flow rate, heating rates, and any other aspect of the brewing system operation. The data collected from sensors 100 is provided to microprocessor 102 and can be used for controlling the brew cycle, comparison with pre-determined performance criteria which may be stored in memory 104, and for recording of faults when data results fail to conform to the performance criteria. The data, particularly concerning system faults is preferably stored in a non-volatile memory 104.

In accordance with a preferred embodiment the self test diagnostic system for the brewing device includes a data transmitter 108 for downloading of performance and fault data. The data transmitter may be configured as an infrared link, an RF link or any other suitable communications link for communicating data stored in the memory 104 to a data recorder 106. The data recorder is provided with a corresponding data receiver or transceiver for enabling it to obtain data from the brewing system. The system can be configured so that the data recorder 106 initiates the data download from the brewing system by transmitting a report initiation code. However, that would require a bidirectional link. Alternatively, the brewing system may be provided with a data download control key sequence (not shown) which will cause the performance data to be downloaded when one or more front panel keys are pressed in sequence by a user. The latter embodiment is advantageous to the extent that it avoids the need for a bidirectional communication link.

Further, as shown in FIG. 11, the brewing system preferably includes a second data link which can also be effected as an optical link, RF link or hard wire link. The second data link preferably includes a data transceiver unit 110 which communicates bi-directionally with an onboard aircraft computer 109. The brewing system is responsive to commands from the aircraft computer for downloading diagnostic data via data transceiver unit 110. Thus any detected faults or performance deficiencies can be communicated to the aircraft computer as requested. In addition, the data link can be used for remote operation of the brewing system.

Figure 12:
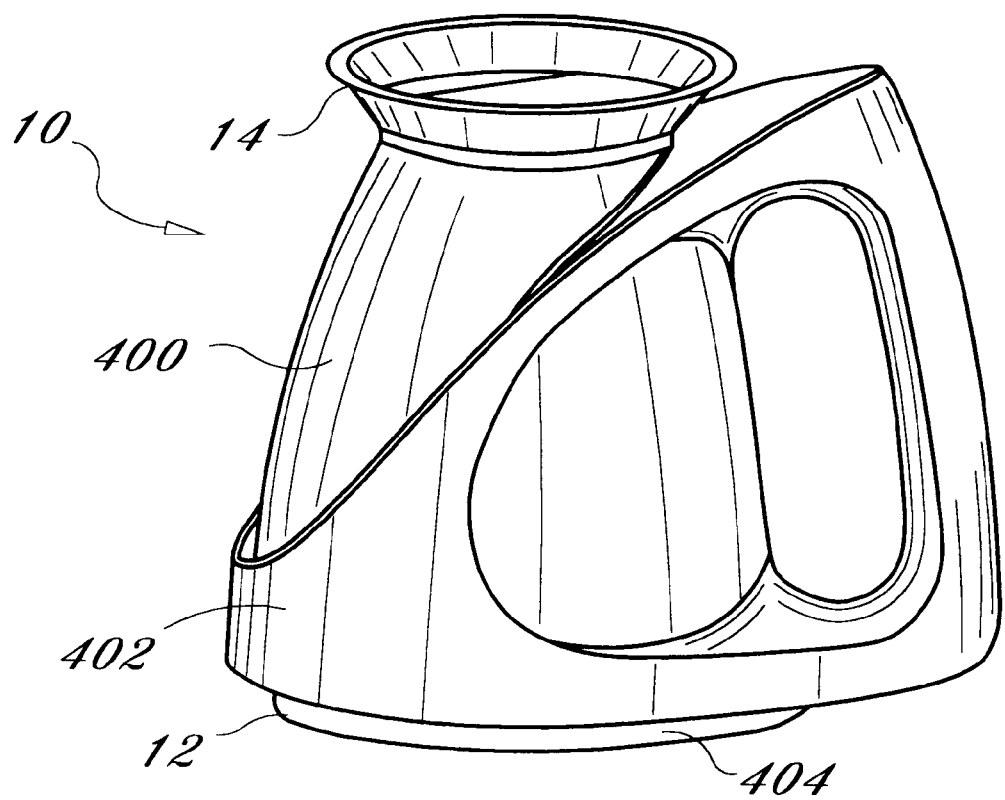
FIG. 12 is a perspective view of a beverage server in accordance with the invention with a container positioned within the handle portion.

FIG. 12 shows a beverage server for use in accordance with the present invention. As shown therein, the holder is comprised of a liquid container 400, which is positioned securely within a modular handle portion 402. The container 400 is comprised of first and second lips 14, 12 respectively as previously described relative to FIGS. 1–4. Significantly, the outer surface of the container 400 is substantially exposed with the beverage server shown for reasons which are discussed below.

Figure 13:
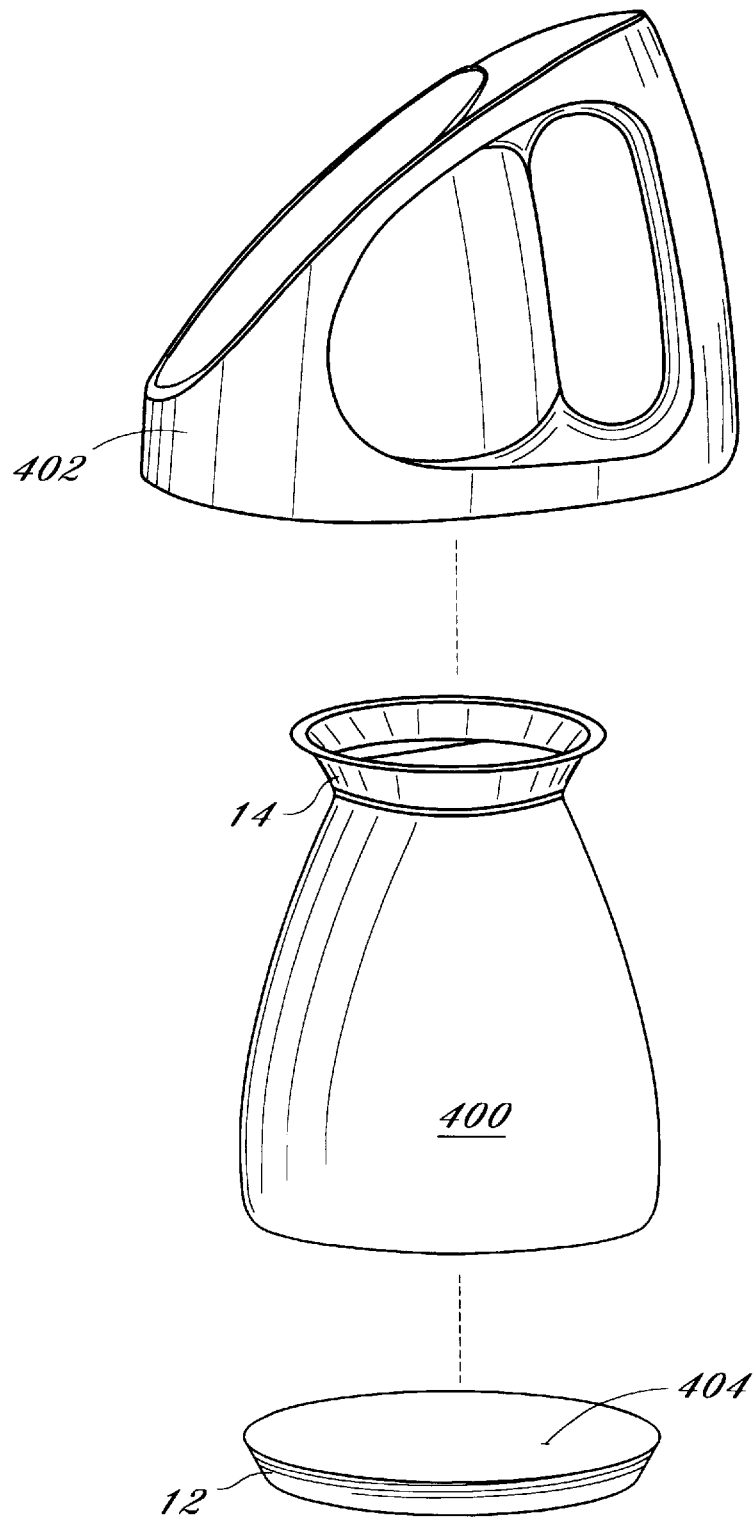
FIG. 13 is a exploded view of the beverage server of FIG. 12 with the container removed from the handle portion of the server.

FIG. 13 is an exploded view of the beverage server in FIG. 12 which shows the manner in which the liquid container 400 may be assembled within the modular handle portion 402 and the base member 404. As shown therein, the liquid container 400 preferably fits snugly within the inner contours of the handle portion 402. The container is held in that position by the base member 404, which is preferably threaded for ease of assembly and removal. When the unit is assembled, and the configuration of the handle is as shown, a substantial portion of the liquid container's outer surface is exposed and therefore visible to passengers.

The modular beverage server shown in FIGS. 12 and 13 is particularly advantageous for use in an aircraft environment where there may be multiple grades of passenger comfort levels offered by an airline. When the beverage server is used to serve passengers in upgraded levels of flying comfort, such as first class passengers, the liquid container can be manufactured to a higher level of elegance and cost. For example, when the beverage server 10 is used for first class passengers, the airline may choose to select a liquid container 400 which has an exterior formed of polished stainless steel or perhaps plated with a precious metal. By comparison, when the beverage server is used in lower grade cabin areas, it may be desirable for an airline to use a less expensive and lighter weight unit having an exterior formed from a more economical material such as plastic. In either case, the design of the liquid container portion 400 and the handle portion 402 facilitate interchangeability for use in different grade cabin areas. In this regard, it should be noted that the handle design is not limited to the precise appearance as shown. Rather, the handle portion 402 may be modified or changed in appearance as may be desired, provided that a substantial portion of the overall exterior of the liquid container 400 remains visible when the unit is assembled.

The beverage holder in FIGS. 12 and 13 has another advantage as well. In particular, extensive commercial use of the beverage server 10 in an airline environment will inevitably lead to worn and damaged units. However, with the system as described herein, a handle portion 402 or container portion 400 which becomes worn or damaged can be individually replaced without discarding the entire unit. This will result in an inevitable cost savings to airlines in replacing such equipment.

What is claimed is:

1. A beverage brewing device having a beverage server locking mechanism for securing a beverage server within a server receiving portion of said beverage brewing device, the beverage server locking mechanism comprising:

a first engagement element, said first engagement element configured for engaging a first lip formed on a first end of said beverage server, and biased for applying a force thereto, the force urging said beverage server toward a second support structure of said beverage brewing device situated adjacent to an opposing second end of said beverage server, said second support structure comprises a second engagement element biased for engaging a second lip formed on said opposing second end of said beverage server, whereby said beverage server is secured within said server receiving portion when the beverage brewing apparatus is subjected to accelerative and vibrational forces.

2. A beverage brewing device as recited in claim 1, wherein said second engagement element has a second retaining face for engaging a peripheral portion of said second lip.

3. A beverage brewing device as recited in claim 2, wherein said brew cup is unlocked by applying a downward force upon a release portion of said first engagement element.

4. A beverage brewing device as recited in claim 3, wherein said server and brew cup locking mechanisms are configured to cooperate such that said server locking mechanism must be in an unlocked position prior to unlocking said brew cup locking mechanism.

5. A beverage brewing device as recited in claim 1, wherein said first and second engagement elements are joined by a linkage system.

6. A beverage brewing device as recited in claim 5, wherein the bias for said first and second engagement elements is provided via said linkage system.

7. A beverage brewing device as recited in claim 6, wherein said linkage system comprises:

a first linkage secured to said first engagement element at a first pivot point;

a second linkage secured to said second engagement element at a second pivot point; and a third linkage interconnecting said first and second linkages, whereby
said third linkage imparts first and second opposing rotational moments to said first and second links, respectively, the first moment urging said first engagement element upward and the second moment urging said second engagement element downward.

8. A beverage brewing device as recited in claim 7, further comprising a brew cup locking means configured for securing a brew cup within a brew cup receiving portion of said beverage brewing device.

9. A beverage brewing device as recited in claim 8, said brew cup locking means comprises:

a downwardly-biased brew cup lid having an integral tab, said tab extending downwardly from said brew cup lid and having first and second recesses formed therein;

a pivotable latch having a latching end, said latching end for engaging the first recess formed in said integral tab; and a pin for engaging the second recess formed in said integral tab.

10. A beverage brewing device as recited in claim 9, wherein said brew cup locking means is configured to be unlocked by applying a downward force upon a release portion of said first engagement element.

11. A beverage brewing device as recited in claim 8, said brew cup locking means comprising:
- a fourth linkage;
- a fifth linkage having first and second ends; and
- a pivoting, spring-loaded leg extending from said fifth linkage,
    - said fourth linkage interconnecting said second engagement element and said fifth linkage,
    - said fifth linkage torsionally-loaded about a third pivot point adjacent to said first end and mechanically attached to said brew cup lid at said second end, said torsional loading biasing said brew cup lid downward against said brew cup.

12. A beverage brewing device as recited in claim 11, whereby said brew cup locking means is configured to be unlocked by applying a downward force upon a release portion of said first engagement element.

13. A beverage brewing device as recited in claim 8, said brew cup locking means comprising:
- a1 a fourth linkage having first and second ends; and
- a second pivotable latch,
    - said fourth linkage torsionally-loaded about a third pivot point adjacent to said first end, and mechanically attached to said brew cup lid at said second end, said fourth linkage torsionally-loaded for biasing said brew cup lid downward against said brew cup, and
    - said pivotable latch torsionally-loaded for engaging an integral latch receiving portion on a side of said brew cup.

14. A beverage brewing device as recited in claim 13, whereby said brew cup locking means is configured to be unlocked by applying a downward force upon a release portion of said first engagement element.

15. A beverage brewing device as recited in claim 8, said brew cup locking means comprising:
- a fourth linkage having first and second ends;
- a second pivotable latch; and
- an extension spring having a first end attached to said brew cup lid and a second end attached to the device housing,
    - the first end of said fourth linkage attached to said second engagement element, the second end of said fourth linkage attached to said second pivotable latch,
    - said second pivotable latch torsionally loaded about a third pivot point such that said second pivotable latch forces said brew cup lid downward against said brew cup, and
    - said extension spring biasing said brew cup lid upward away from said brew cup, forcing said brew cup lid away from said brew cup when said second pivotable latch is disengages said brew cup lid.

16. A beverage brewing device as recited in claim 1, wherein said first engagement element has a first retaining face for engaging a peripheral portion of said first lip.

17. A beverage brewing device as recited in claim 16, wherein said first retaining face is a peripheral wall of an opening extending through said first engagement element.

18. A beverage brewing device as recited in claim 16, wherein said first retaining face is a peripheral wall of a recess formed in said first engagement element.

19. A beverage brewing device as recited in claim 16, wherein said first retaining face extends upwardly away from said first engagement element.

* * * * *

UNITED STATES PATENT AND TRADEMARK OFFICE
CERTIFICATE OF CORRECTION

PATENT NO : 6,047,630
DATED : April 11, 2000
INVENTOR(S) : BROWN, Jeffrey C., et al It is certified that error appears in the above-identified patent and that said Letters Patent are hereby corrected as shown below:

Column 11, line 23, delete "a1".

Signed and Sealed this

Third Day of April, 2001

Attest:

NICHOLAS P. GODICI

*Attesting Officer*   Acting Director of the United States Patent and Trademark Office